United States Patent [19]

Hikosaka

[11] 3,766,545

[45] Oct. 16, 1973

[54] DIGITAL PHASE DETECTOR

[76] Inventor: Mitsuo Hikosaka, 1590-18, Oaza Kokura, Kasuga-cho, Chikushi-gun, Fukuoka-ken, Japan

[22] Filed: Jan. 25, 1972

[21] Appl. No.: 220,660

[30] Foreign Application Priority Data

Feb. 6, 1971 Japan .............................. 46/4890

[52] U.S. Cl. .. 340/347 SY, 340/347 AD, 324/83 D, 328/133

[51] Int. Cl. ......................... H03r 9/06, H03d 13/00

[58] Field of Search ............... 340/347 SY, 347 AD; 324/83 D, 83 R; 328/133

[56] References Cited

UNITED STATES PATENTS 3,548,321 12/1970 Duquesne ........................ 324/83 D 3,538,345 11/1970 Norz .................................. 328/133

*Primary Examiner*—Thomas A. Robinson

*Attorney*—Donal E. McCarthy et al.

[57] ABSTRACT

Disclosed herein is an improved apparatus for converting an analog signal of unknown phase into a binary-coded digital form. It includes a plurality of phase detectors which compare the analog signal with their associated reference signals having different phases from each other and provide output voltages corresponding to the phase differences. The outputs of the phase detectors are supplied to their associated groups of threshold detectors for comparison with different predetermined reference levels. A logic circuitry is responsive to the outputs of the threshold detectors to generate the binary-coded digital signal. When employed in a radar system, this invention enables the detection of digital video signals directly from the received signals at radio or intermediate frequency without translating them into analog video signals.

2 Claims, 12 Drawing Figures

| PHASE DIFFERENCE / THRESHOLD DETECTOR OUTPUT | 0°∼45° | 45°∼90° | 90°∼135° | 135°∼180° | 180°∼225° | 225°∼270° | 270°∼315° | 315°∼360° |
|---|---|---|---|---|---|---|---|---|
| TD1 | 0 | 1 | 1 | 0 | 0 | 0 | 0 | 0 |
| TD2 | 1 | 1 | 1 | 1 | 0 | 0 | 0 | 0 |
| TD3 | 1 | 1 | 1 | 1 | 1 | 0 | 0 | 1 |
| TD4 | 1 | 0 | 0 | 0 | 0 | 0 | 0 | 1 |
| TD5 | 1 | 1 | 0 | 0 | 0 | 0 | 1 | 1 |
| TD6 | 1 | 1 | 1 | 0 | 0 | 1 | 1 | 1 |

| PHASE DIFFERENCE / BINARY CODED INFORMATION | 0°~45° (A=1) | 45°~90° (B=1) | 90°~135° (C=1) | 135°~180° (D=1) | 180°~225° (E=1) | 225°~270° (F=1) | 270°~315° (G=1) | 315°~360° (H=1) |
|---|---|---|---|---|---|---|---|---|
| θ· MSB | 0 | 0 | 0 | 0 | 1 | 1 | 1 | 1 |
| θ· 2nd LSB | 0 | 0 | 1 | 1 | 0 | 0 | 1 | 1 |
| θ· LSB | 0 | 1 | 0 | 1 | 0 | 1 | 0 | 1 |
| θ· DET | 1 | 1 | 1 | 1 | 1 | 1 | 1 | 1 |

| PHASE DIFFERENCE / THRESHOLD DETECTOR OUTPUT | 0°~30° | 30°~60° | 60°~90° | 90°~120° | 120°~150° | 150°~180° | 180°~210° | 210°~240° | 240°~270° | 270°~300° | 300°~330° | 330°~360° |
|---|---|---|---|---|---|---|---|---|---|---|---|---|
| TD1 | 0 | 1 | 1 | 1 | 1 | 0 | 0 | 0 | 0 | 0 | 0 | 0 |
| TD2 | 1 | 1 | 1 | 1 | 1 | 1 | 0 | 0 | 0 | 0 | 0 | 0 |
| TD3 | 1 | 1 | 1 | 1 | 1 | 1 | 1 | 0 | 0 | 0 | 0 | 1 |
| TD4 | 1 | 0 | 0 | 0 | 0 | 0 | 0 | 0 | 0 | 1 | 1 | 1 |
| TD5 | 1 | 1 | 0 | 0 | 0 | 0 | 0 | 0 | 1 | 1 | 1 | 1 |
| TD6 | 1 | 1 | 1 | 0 | 0 | 0 | 0 | 1 | 1 | 1 | 1 | 1 |
| TD7 | 0 | 0 | 0 | 0 | 0 | 1 | 1 | 1 | 1 | 0 | 0 | 0 |
| TD8 | 0 | 0 | 0 | 0 | 1 | 1 | 1 | 1 | 1 | 1 | 0 | 0 |
| TD9 | 0 | 0 | 0 | 1 | 1 | 1 | 1 | 1 | 1 | 1 | 1 | 0 |

DIGITAL PHASE DETECTOR

This invention relates to digital phase detectors and more particularly to an apparatus for converting an analog signal of unknown phase into a binary-coded digital form.

In the ordinary radar receiving system, the detection of digital video signals is performed by amplifying and then detecting the intermediate-frequency signal derived from received video returns and thereafter converting the resulting analog signals at video frequency into the digital video signals by the use of an analog-to-digital converter. However, this method of detection is not satisfactory, partly because of the frequent detection of false target information due to noise and partly because of unavoidable range errors introduced during analog-to-digital conversion. Further, in the conventional MTI radar system, the intermediate-frequency signal is compared in a phase detector with a reference signal from a coho oscillator, and the resulting analog video signal having an amplitude determined by the phase difference therebetween is delayed for a fixed period of time equal to one pulse repetition period of the radar system. Then, the delayed analog signal is compared with the undelayed analog signal in order to establish the identity of received signals from a moving target if the difference therebetween is not zero. However, difficulties are experienced in discriminating between the received signals from true moving targets and those from false targets due to the combined effects of interference waves, man-made noise, randomly changing sea echo, etc.

According to this invention, an unknown analog signal is compared in a plurality of phase detectors with the same plurality of reference signals which are out of phase with each other by predetermined magnitudes. The outputs of the phase detectors are supplied to their associated groups of threshold detectors for comparison with different predetermined reference levels. The threshold detectors' outputs are then processed by a logic circuitry to provide a binary-coded digital signal representative of the phase of the analog signal. If this invention is employed in the radar system, the received signals at radio frequency or intermediate frequency are converted directly into digital video signals without being translated into analog video signals. Moreover, in the MTI system to which this invention is applied, comparison of the delayed and undelayed signals is made on the basis of the binary-coded digital signal, thus eliminating the above-said disadvantages possessed by the conventional MTI system.

Therefore, it is an object of the present invention to provide a new and improved apparatus for converting an analog signal of unknown phase into a binary-coded digital form.

Another object of the present invention is to provide an improved apparatus of the type described above that is adapted especially for use in a radar system.

It is a further object of the present invention to provide an improved digital phase detector offering an increased precision of operation and the economy of construction.

These and other objects will be readily apparent from the following description of embodiments of the invention when read in connection with the accompanying drawings, in which:

FIG. 1 is a block diagram of one preferred embodiment according to this invention;

FIGS. 2*a* AND 2*b* are graphs showing amplified outputs of the phase detectors employed in the apparatus of FIG. 1;

Figure 1:
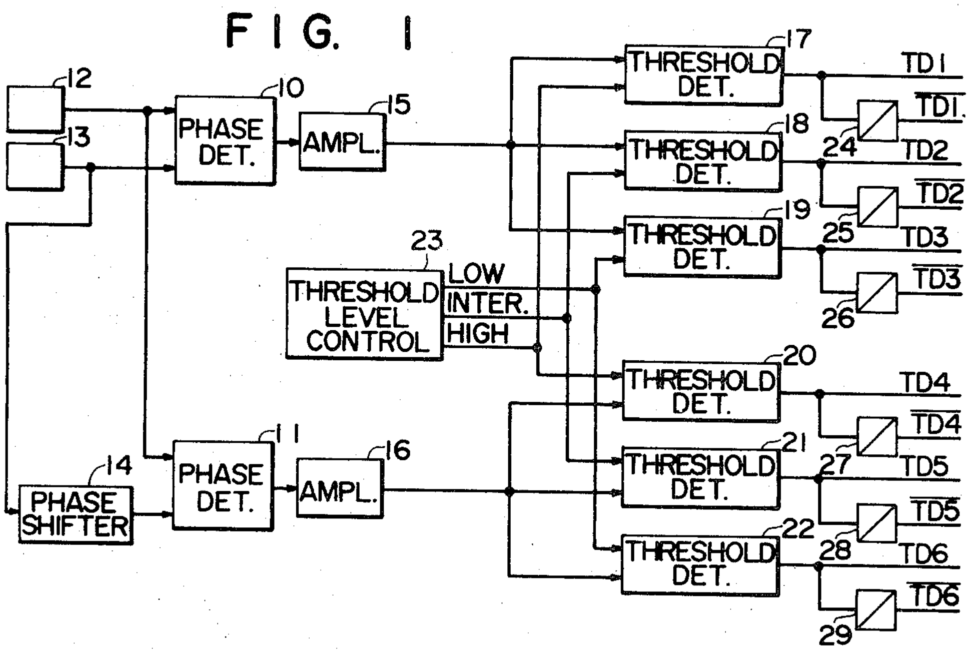

With reference to the drawings, FIG. 1 shows a preferred embodiment of the present invention. As previously indicated, the invention will best be described for explanatory purposes in conjunction with a radar system, though the invention may be employed for other applications in which it is necessary to convert an analog signal of unknown phase into a digital form.

As shown, the apparatus according to the invention comprises two phase detectors 10 and 11 of the conventional type and having an identical output characteristic. One input of each phase detector 10, 11 is connected together to a source 12 to receive an analog signal of unknown phase therefrom. The other input of the phase detector 10 is connected directly to a source of reference signal 13, while that of the phase detector 11 is connected through a phase shifter 14 to the reference signal source 13. In radar applications, the sources 12 and 13 may be an IF amplifier and a coho oscillator, respectively. The phase shifter 14 is of the conventional type which, in the illustrated embodiment, is capable of providing a phase shift of 90°. The outputs of the phase detectors 10, 11 are supplied to amplifiers 15, 16, respectively, for amplification. The amplifiers, 15, 16 may preferably be of the precision type acting as a buffer amplfiier. However, the amplifiers 15, 16 may be omitted, as the case may be.

Figure 2A:
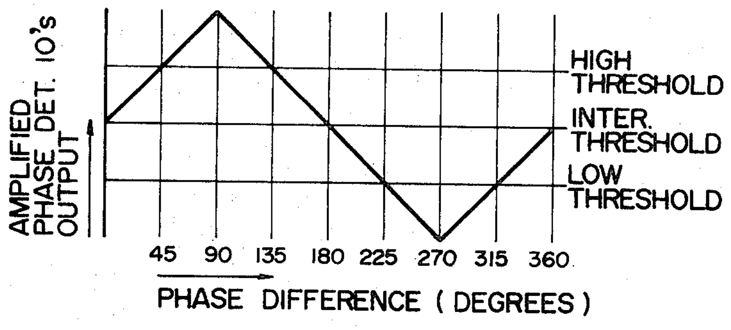
Figure 2B:
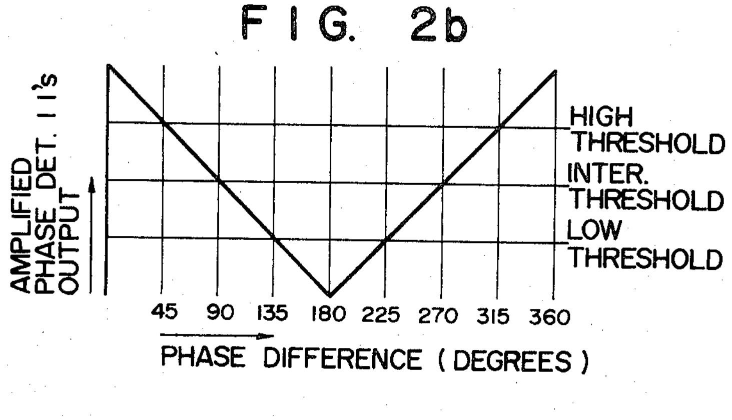

With the connection described above, the amplifiers 15, 16 have generally triangular output characteristics against the varying phase difference between the analog signal and the reference signal, as shown in FIGS. 2*a* and 2*b*, respectively. From the characteristic curves shown, it will be seen that the output of the amplifier 16 is 90° out of phase with that of the amplifier 15 because of the provision of the phase shifter 14.

The apparatus of this invention also includes two groups of threshold detectors 17 through 22, each of which is capable of generating logic outputs indicating the polarity of a voltage breakdown occurring between an input signal and a particular reference level, compared to ground potential. To receive the input signal, each of the first group of threshold detectors 17, 18 and 19 is connected at its one input to the amplifier 15 and, on the other hand, each of the second group of threshold detectors 20, 21 and 22 is connected at its one input to the amplifier 16. The individual reference levels or voltages are provided by a threshold level control unit 23 which may be of the potentiometer type capable of being manually or automatically adjusted to provide three different voltages. The threshold level control unit 23 has three outputs, that is, high, intermediate and low reference voltage outputs, the high one of which is connected to the other inputs of the threshold detectors 17 and 20, the intermediate one of which is connected to the threshold detectors 18 and 21, and the low one of which is connected to the threshold detectors 19 and 22. In this instance, the threshold level control unit 23 is precisely adjusted so as to provide the three different reference voltages relative to the outputs of the amplifiers 15, 16, as shown in FIGS. **2*a* and 2*b*. Thus, the threshold detectors 17 and 20 compare the high predetermined reference voltage with their respective input signals and provide logic outputs TD1 and TD4; the threshold detectors 18 and 21 compare the intermediate predetermined reference voltage with their respective input signals and provide logic outputs TD2 and TD5; and the threshold detectors 19 and 22 compare the low predetermined reference voltage with their respective input signals and provide logic outputs TD3 and TD6. The logic output TD1 and TD4 is in the true (1) state when the inputs of the associated threshold detectors 17 and 20 are higher than the high predetermined reference voltage and in the false (0) state when the inputs are lower than the reference voltage. Likewise, the output TD2 and TD5 is in the true state when the inputs of the associated threshold detectors 18 and 21 are above the intermediate reference voltage and in the false state when the inputs are below the reference voltage, and the output TD3 and TD6 is in the true state when the inputs of the threshold detectors 19 and 22 are above the low reference voltage and in the false state when the inputs are below the reference voltage. Accordingly, the logic outputs which are obtainable from the six threshold detectors 17 through 22 for each 45 degrees of the phase difference between the analog signal and the reference signal are shown in the Table of FIG. 3.** It will be seen from the Table that, in this embodient, the unknown phase of an analog signal is detected as a combination of six logic signals.

Reverting to FIG. 1, the threshold detectors 17 through 22 have connected to the outputs thereof six NOT gates 24 through 29, respectively, which invert the outputs of the associated threshold detectors to provide inverted outputs $\overline{TD1}$, $\overline{TD2}$, $\overline{TD3}$, $\overline{TD4}$, $\overline{TD5}$ and $\overline{TD6}$, respectively.

Figures 3, 4:
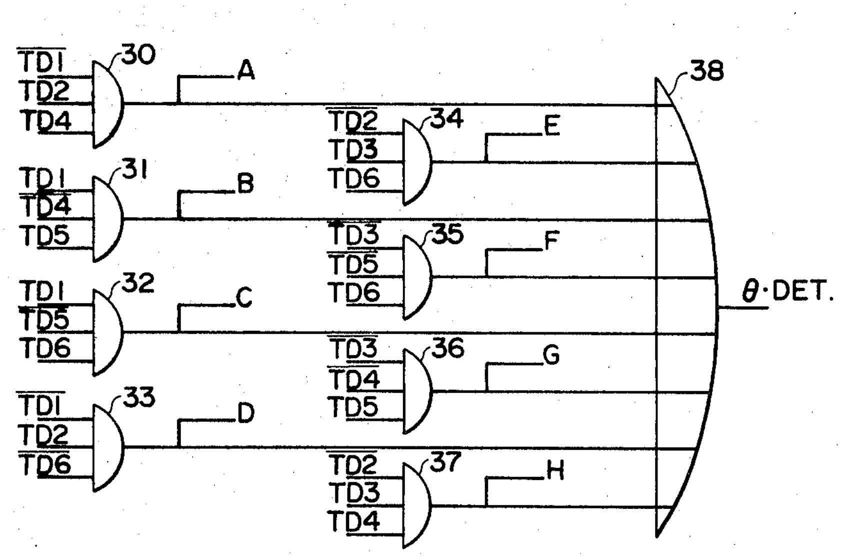
FIG. 3 is a table showing the logic outputs of the threshold detectors incorporated in the apparatus of FIG. 1.
FIG. 4 shows a logic circuitry for detecting phase information from the logic outputs of the threshold detectors.

FIG. 4 shows one arrangement of detecting the phase information from the logic outputs provided by the circuit of FIG. 1. As shown, eight AND gates 30 through 37 are provided, each of which has three inputs connected to the particular outputs of the threshold detectors and the NOT gates. Particularly, the three inputs of the AND gate 30 are connected to the NOT gate 24 and the threshold detectors 18 and 20 to receive logic outputs $\overline{TD1}$, TD2 and TD4 therefrom. When A(=$\overline{TD1}$·TD2·TD4) = 1, the output of the AND gate 30 assumes the true (1) state which indicates the detection of the analog signal having a phase difference of 0° to 45° with respect to the reference signal. Following are the logic statements for the remaining seven AND gates corresponding to each 45° of the phase difference ranging from 45° to 360°.

AND gate 31 . . . B = TD1·$\overline{TD4}$·TD5 ;
AND gate 32 . . . C = TD1·$\overline{TD5}$·TD6 ;
AND gate 33 . . . D = $\overline{TD1}$·TD2·$\overline{TD6}$ ;
AND gate 34 . . . E = $\overline{TD2}$·TD3·$\overline{TD6}$ ;
AND gate 35 . . . F = $\overline{TD3}$·$\overline{TD5}$·TD6 ;
AND gate 36 . . . G = $\overline{TD3}$·$\overline{TD4}$·TD5 ; and
AND gate 37 . . . H = $\overline{TD2}$·TD3·TD4 .

Also shown in FIG. 4 is an OR gate 38 having its eight inputs connected to the respective outputs of the AND gates 30 through 37. The function of the OR gate 38 is to provide a true output $\theta$·DET when any of the ouputs of the AND gates 30 through 37 is in the true state, thereby indicating the presence of an analog signal having a sufficient amplitude to permit the exact detection of the phase information of the signal.

Figures 5, 6:
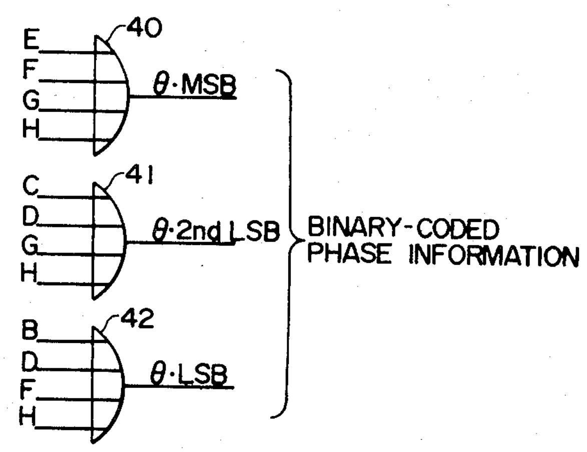
FIG. 5 shows a coding circuit for converting the phase information into a binary-coded octal form.
FIG. 6 is a table showing the binary-coded octal number against each 45° of the phase difference ranging from 0° to 360°.

FIG. 5 shows a coding circuit for converting the phase information detected by the circuit of FIG. 4 into a binary-coded octal form. The coding circuit includes three OR gates 40, 41 and 42 each having four inputs connected to the particular outputs of the AND gates 30 through 37. As is appreciated by those familiar with the art of computer, the four inputs of the OR gate 40 which corresponds to the most significant binary digit ($\theta$·MSB) are connected to the AND gates 34, 35, 36 and 37 to receive the outputs E, F, G and H therefrom. Since the OR gate 41 corresponds to the second least significant digit ($\theta$·2ndLSB), the inputs thereof are connected to the AND gates 32, 33, 36 and 37 so that the respective outputs C, D, G and H are supplied to the OR gate 41. The OR gate 42 corresponding to the least significant binary digit ($\theta$·LSB) is connected to the AND gates 31, 33, 35 and 37 so as to be supplied with the outputs B, D, F and H. Thus, the three outputs of the OR gates 40, 41 and 42 form a binary-coded octal number which varies according to the Table shown in FIG. 6 for each 45° of the phase difference between the analog signal and the reference signal.

It will be understood from the table that since A = 1 when the phase difference falls within 0° ~ 45°, the AND gate 30 producing the signal A is not connected to any of the OR gates 40, 41 and 42. On the other hand, the AND gate 31, which produces an output B when the phase difference lies within 45° ~ 90°, is connected to the OR gate 42 corresponding to the least significant binary digit.

It should be noted that the table of FIG. 6 also contains the OR gate 38's output $\theta$·DET which serves to distinguish the logical state 0, 0, 0 corresponding to 0° ~ 45° from the state 0, 0, 0 in which there is no analog signal received by the apparatus of the invention.

With the arrangement described above and shown in FIGS. 1, 4 and 5, it is possible to quantize or digitize an analog signal of unknown phase and to provide a binary-coded octal number representative of the phase with such accuracy that each 45° of the phase corresponds to one octal number.

It will be appreciated that noise due to external sources of noise such as, for example, clutter is effectively removed during the processes of phase detection and threshold detection.

Further, it is to be noted that the analog signal provided by the source should have a sufficient amplitude to enable the phase detector 10, 11 to have the output characteristics shown in FIGS. 2a and 2b. However, it will be appreciated that by multiplexing the arrangement shown in FIGS. 1, 4 and 5 while adjusting properly the threshold levels and simultaneously providing for compensated amplification, the unknown analog signal can be converted into an exact digital number representative of the phase of the signal, irrespective of the intensity of the analog signal.

Figure 7:
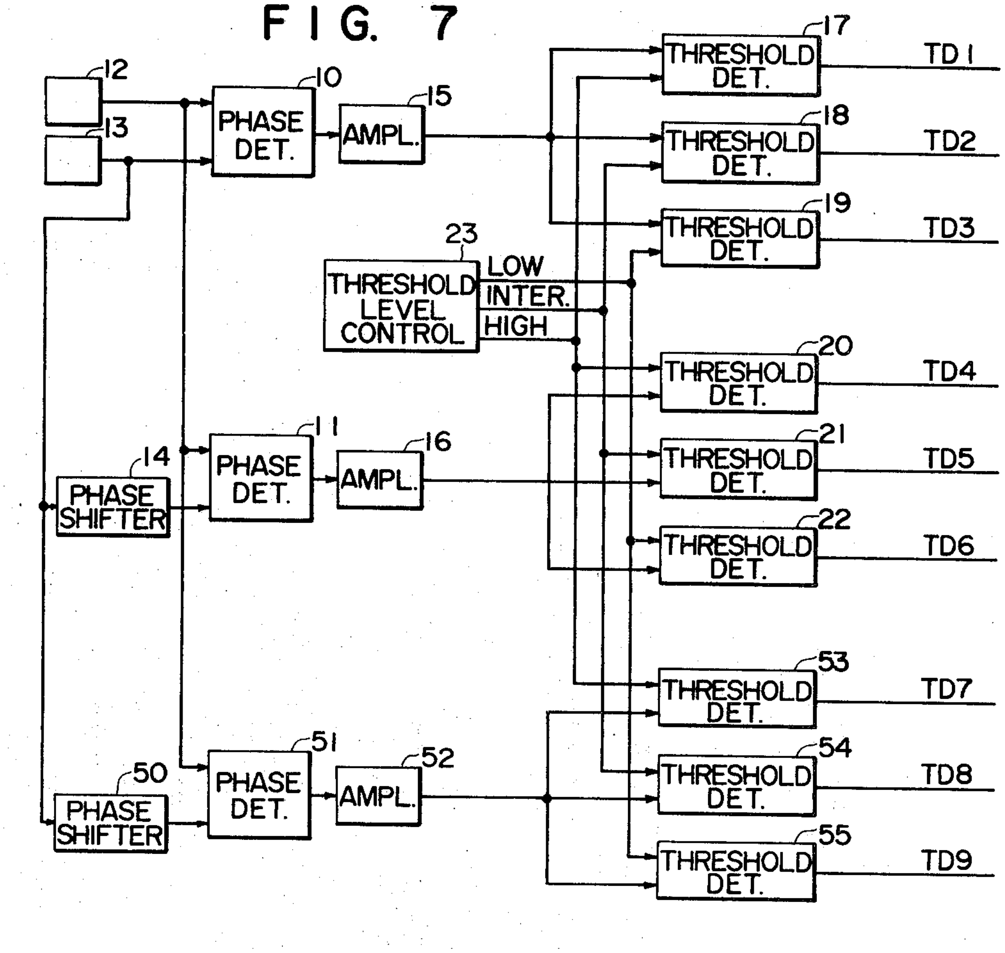
FIG. 7 is a block diagram showing another embodiment of this invention.

FIG. 7 shows another embodiment of this invention. As will be apparent from comparison with FIG. 1, the apparatus as herein shown includes a phase shifter 50, a phase detector 51, an amplifier 52 and a group of threshold detectors 53, 54 and 55, in addition to the arrangement shown in FIG. 1. The phase detector 51 have a generally triangular output characteristic which is identical to that of the phase detectors 10, 11. The phase shifter 50 is of the type similar to the phase shifter 14 of FIG. 1, but is adjusted to provide a phase shift of 240°. The phase shifter 14, in this embodiment, is adjusted to provide a phase shift of 120° rather than 90°. The input of the phase shifter 50 is connected to the source of reference signal 13, and the output thereof is connected to one input of the phase detector 51. The other input of the phase detector 51 is connected to the source 12 to receive the unknown analog signal therefrom. Thus, the phase detector 51 functions to compare the analog signal with the phase-shifted reference signal and to provide an output corresponding to the phase difference therebetween. The output of the phase detector 51 is supplied to the following amplifier 52 before being compared with the threshold levels in the threshold detectors 53, 54 and 55.

Figures 8, 9:
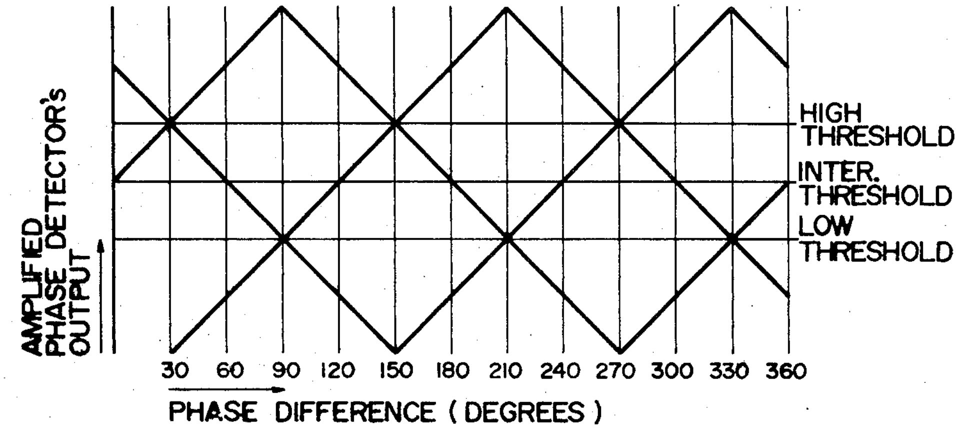
FIG. 8 is similar to FIGS. 2*a* and 2*b*, but shows the output characteristics of the three phase detectors shown in FIG. 7.
FIG. 9 is similar to FIG. 3, but shows the threshold detectors' outputs associated with the embodiment of FIG. 7.

FIG. 8 shows the output characteristics of the amplifiers 15, 16 and 52 which are similar to those shown in FIGS. 2a and 2b. As will be seen, the three outputs are 120° out of phase with each other due to the phase shifts provided by the phase shifters 14 and 50.

As described above, the outputs of the amplifiers 15, 16 and 52 are supplied to the associated groups of threshold detectors for comparison with the individual reference levels. Each of the threshold detectors 53, 54 and 55 is connected at its one input to the particular output of the threshold level control unit 23 so as to be supplied with the high, intermediate and low reference voltages, respectively. In this instance also, the threshold level control unit 23 is precisely adjusted so that the three different reference voltages have such relationship to the amplifiers' outputs as shown in FIG. 8. By so doing, the threshold detectors can have the logic output as shown in FIG. 9 for the varying phase difference between the analog signal and the reference signal.

With this arrangement, the unknown phase of an analog signal is detected as a combination of nine logic signals for each 30° of the phase ranging from 0° to 360°. If it is desired to provide a digital representation of the unknown phase, the outputs of the threshold detectors are connected to such coding circuits as those shown in FIGS. 4 and 5. Thus, it will be appreciated that by increasing the number of phase detectors, phase shifters and threshold detectors while at the same time properly adjusting the magnitude of phase shifts provided by the phase shifters and the height of reference levels in the threshold detectors, it is possible to provide a binary-coded phase information for each of more finely sections of the phase ranging from 0° to 360°.

Figure 10:
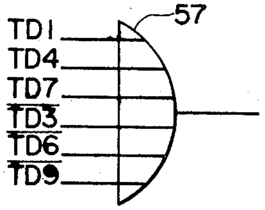
FIG. 10 is an OR gate for determining the presence of received analog signals in response to the particular outputs of the threshold detectors.

FIG. 10 shows one arrangement of determining the presence of an analog signal in response to the particular outputs of the threshold detectors. As shown, an OR gate 57 is provided whose six inputs are connected to the outputs of the threshold detectors 17, 20 and 53 and to the outputs of NOT gates (not shown) associated with the threshold detectors 19, 22 and 55. When an analog signal is present, any of the six inputs of the OR gate 57 is in the true state, that is, $TD1 + TD4 + TD7 + \overline{TD3} + \overline{TD6} + \overline{TD9} = 1$, so that the OR gate 57 produces a true output. The true output indicates the presence of an analog signal, irrespective of whether the analog signal has a sufficient amplitude to permit the exact detection of the unknown phase of the signal. In contrast, it should be remembered that the true output θ·DET of the OR gate 38 (shown in FIG. 4) indicates the presence of an analog signal having a sufficient amplitude to permit the exact detection of the phase information of the signal. Thus, with the provision of such an OR gate as indicated at 38 (FIG. 4) in the second embodiment also, if the output of the OR gate 38 is in the 0 state while that of the OR gate 57 is in the 1 state, it could be presumed that there is an analog signal received by the apparatus, but that it is impossible to digitally detect the phase information from the signal due to, for example, too low field strength of received video returns in the case of radar applications.

It will be appreciated that if the present invention is employed in conjunction with tracking radar systems, it would be advantageous to cause the output of the OR gate 57 to pass through a pulse-width discriminator having a delay time substantially equal to the width of a radar transmitted pulse, since it becomes possible to extract only such echo pulses having a width substantially equal to that of the transmitted pulses from received signals, thus removing radar inputs resulting from fixed targets, interference waves, etc. Further, it should be understood that according to this invention there is no need to effect phase synchronization of the reference signal in the process of detecting the received pulse signals.

Figure 11:
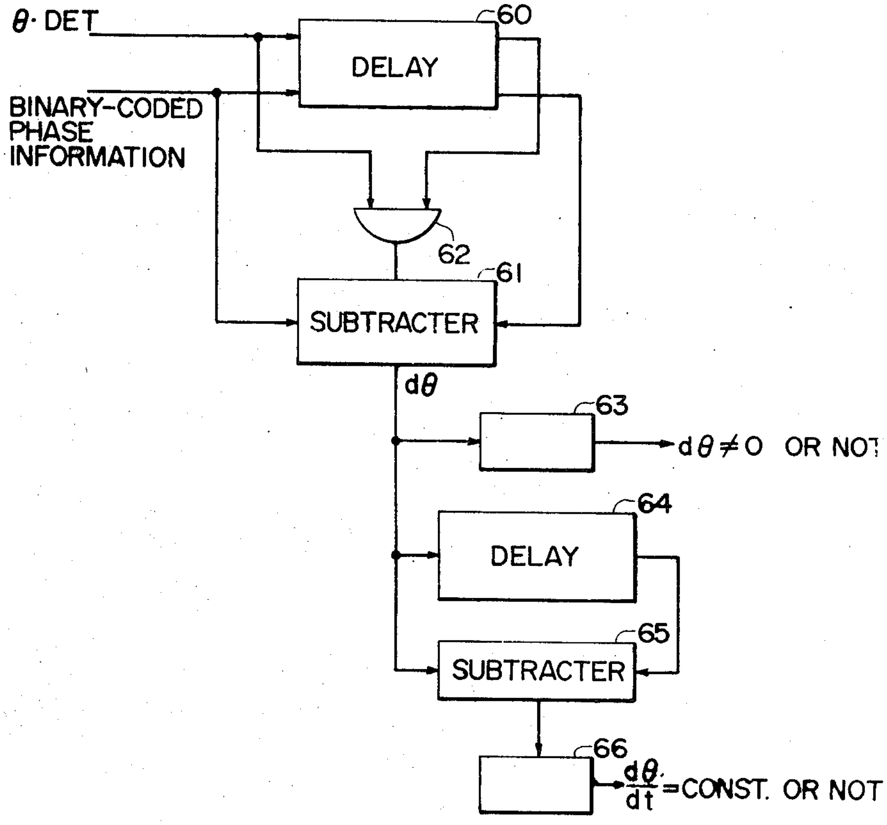
FIG. 11 is a block diagram of an MTI radar system incorporating the apparatus of this invention.

FIG. 11 shows a block diagram of an MTI radar system incorporating the apparatus of this invention. Although not shown, the apparatus according to this invention should be understood as receiving a properly amplified IF signal and a reference signal from an IF amplifier and a coho oscillator, respectively, of the radar system.

As shown, the MTI system comprises a delay device 60 having two inputs connected to the apparatus of this invention in such a manner as to receive a θ·DET signal and a binary-coded phase information therefrom. The θ·DET signal and the binary-coded phase information could be obtained, for example, from the OR gate 38 (FIG. 4) and the OR gates 40, 41 and 42 (FIG. 5), respectively. The delay device 60 is usually a storage device comprising a core memory, which is capable of retaining or delaying an input signal for a fixed period of time equal to one pulse repetition period of the radar system. The delay device also has two outputs each corresponding to one of the two inputs thereof, so that the delayed θ·DET and binary-coded phase information can be obtained at the outputs.

A subtracter 61 is provided for subtracting the delayed phase information from the undelayed phase information. To do this, the subtracter 61 is connected at its two inputs to the input and output of the delay device 60 associated with the binary-coded phase information. On the other hand, the input and output of the delay device 60 associated with θ·DET are connected to two inputs of an AND gate 62 whose output is connected to the subtracter 61. The function of the AND gate 62 is to detect the condition of the delayed and undelayed θ·DET being simultaneously in the true (1) state and to actuate the subtracter 61 during the presence of the particular condition, thereby making the difference *dθ* between the delayed and undelayed phase information valid. However, the AND gate 62 may be omitted, as the case may be.

As is appreciated by those skilled in the art, the fact that the difference *dθ* is not zero indicates the presence of received signals from a moving target. A discriminator 63 is connected to the output of the subtracter 61 for the purpose of judging whether *dθ* is zero or not. The subtracter 61's output is also supplied to another set of delay device 64 and subtracter 65. The subtracter 65 has two inputs, one of which is connected to the subtracter 61 and the other of which is connected to the output of the delay device 64, to receive the undelayed *dθ* and delayed *dθ*, respectively, therefrom. The delay device 64 is of the type similar to the delay device 60 and produces a delay equal to one pulse repetition period. Thus, it will be understood that the output of the subtracter 65 is *dθ/dt*, which is the rate of change of *dθ* per one pulse repetition period. In this connection, it has been empirically recognized that although the phase of man-made noise, intererence waves and randomly changing sea echo, etc. has the rate of change *dθ/dt* that varies randomly from one pulse repetition period to another, the *dθ/dt* of the echo signals from true moving targets lies within a such a certain permissible range that it could well be thought to be substantially constant. In order to utilize this empirical fact, another discriminator 66 is provided which responds to the subtracter 65's output to effectively discriminate between the echo signals from true moving targets and those from false targets.

Although this invention has been shown and described in connection with one application for the ordinary MTI system, it will be understood that the invention could equally be applied to other types of MTI systems, such as a multiple-staggered MTI system. Further, it is to be understood that this invention could be employed in a multiple-pulse data transmission system utilizing phase modulation, in which case there is no need to cause the receiver to be phase synchronized with the reference signal of the transmitter, since the receiver can detect the phase information on the basis of intermittently received synchronizing signals.

What is claimed is:

1. Apparatus for converting an analog signal of unknown phase into a binary-coded digital form, comprising:

means for generating said analog signal of unknown phase;

means for generating a first reference signal;

means responsive to said first reference signal for generating a second reference signal which is 120° out of phase with said first reference signal;

means responsive to said first reference signal for generating a third reference signal which is 240° out of phase with said first reference signal;

first, second and third phase detectors responsive to said analog signal and to said first, second and third reference signals, respectively, for detecting the phase difference therebetween;

first, second and third threshold detectors having a common input connected to said first phase detector;

fourth, fifth and sixth threshold detectors having a common input connected to said second phase detector;

seventh, eighth and ninth threshold detectors having a common input connected to said third phase detector;

means for supplying a first predetermined reference level to said first, fourth and seventh threshold detectors and for supplying a second predetermined reference level to said second, fifth and eighth threshold detectors and for supplying a third predetermined reference level to said third, sixth and ninth threshold detectors;

nine inverters each connected to one of said nine threshold detectors; and means responsive to said first to ninth threshold detectors for providing a binary-coded digital signal representative of the phase of said analog signal.

2. The apparatus according to claim 1, further comprising:

means responsive to the outputs of said first, fourth and seventh threshold detectors and to the outputs of said inverters connected to said third, sixth and ninth threshold detectors for determining the presence of said analog signal. the intensity of the analog signal. respectively, of the radar system.

means for supplying a first predetermined reference

* * * * *